United States Patent [19]

Maitani et al.

[11] 4,001,845

[45] Jan. 4, 1977

[54] ELECTRICAL SHUTTER CIRCUIT FOR CAMERA

[75] Inventors: Yoshihisa Maitani; Akihiko Hashimoto, both of Hachioji, Japan

[73] Assignee: Olympus Optical Co., Ltd., Tokyo, Japan

[22] Filed: Mar. 5, 1975

[21] Appl. No.: 555,373

[30] Foreign Application Priority Data

Mar. 22, 1974 Japan .................... 49-32700[U]

[52] U.S. Cl. .............................. 354/51; 354/60 L
[51] Int. Cl.² .................... G03B 17/20; G03B 7/08
[58] Field of Search ............ 354/50, 51, 60 R, 31, 354/60 L

[56] References Cited

UNITED STATES PATENTS

| | | | |
|---|---|---|---|
| 3,470,798 | 10/1969 | Miyakawa ................. | 354/31 X |
| 3,690,229 | 9/1972 | Kikuchi et al. ............ | 354/50 X |
| 3,698,298 | 10/1972 | Kikuchi et al. ............ | 354/50 X |
| 3,860,936 | 1/1975 | Harvey ...................... | 354/51 |

Primary Examiner—L. T. Hix
Assistant Examiner—J. A. LaBarre

[57] ABSTRACT

An electrical shutter circuit for a camera includes a photoelectric transducer element which is responsive to light from an object being photographed to determine a proper exposure period in accordance with the brightness thereof, thus automatically controlling the operation of a shutter assembly which opens or closes an exposure light path. In the open position of the shutter assembly, the photoelectric transducer element is irradiated with light of a fixed, relatively low intensity emitted by a luminescent element so that the electrical shutter circuit is automatically operated for the closing operation after a period of time determined by the light from the luminescent element even if the incident light from the object being photographed is extremely weak or completely absent.

4 Claims, 3 Drawing Figures

ELECTRICAL SHUTTER CIRCUIT FOR CAMERA

BACKGROUND OF THE INVENTION

The invention relates to an electrical shutter circuit for camera which provides an automatic, proper control of the shutter open time in accordance with the brightness of an object being photographed.

As is well known, a camera incorporating an electrical shutter is constructed such that the depression of a shutter button is effective to operate a shutter assembly for an opening movement so as to open an exposure light path to initiate an exposure operation, and simultaneously a photoelectric transducer element contained within an electrical shutter control circuit becomes responsive to reflected light from an object being photographed so that when a proper exposure period has elapsed, the electrical shutter control circuit operates to close the shutter assembly automatically. However, with a camera of this kind, there is a disadvantage that a shutter assembly, once released, remains open for an indenfinite period of time where reflective light from an object being photographed is absent or extremely weak. For example, when the shutter is operated with a camera directed toward the darkness or when the shutter is inadvertently released when encasing the camera, the shutter remains open. The exposure period for the shutter will be from several minutes to an indefinite period of time in this instance, so that the battery will be exhausted in vain, preventing subsequent photographing operations.

The above disadvantage is also involved when loading film into the camera in a dim place. Specifically, when loading film into the camera, it is initially necessary to provide an idle film feed for the first two or three frames. With a camera of a self-cocking type, the film winding operation is prevented unless the exposure through the shutter is completed. Because an incident light directed onto an electrical shutter is reduced in a dim place, an automatic completion of the shutter operation is prevented, thus precluding an idle film feeding operation.

Summary of the Invention

It is an object of the invention to eliminate such disadvantages of a conventional electrical shutter by providing an electrical shutter circuit for cameras which assures a closing operation of the shutter assembly after a period of time which corresponds to the maximum open period of the shutter assembly obtainable when a shutter control circuit is able to respond to the brightness of an object being photographed, in the event that the brightness of the object being photographed is reduced below a given level to prevent the shutter control circuit from establishing a proper shutter open period.

It is another object of the invention to provide an electrical shutter circuit for a camera which permits the timing at which the shutter assembly is operated for a closing operation to be controlled over a number of steps.

In accordance with the invention, there is provided a photo-bias circuit which irradiates a photoelectric transducer element of an electrical shutter control circuit, which provides the photometry of the brightness of an object being photographed, with light of a given intensity so as to assure that in the absence of incident light on the photoelectric transducer element, the shutter assembly is operated for a closing movement after a given period of time. In one arrangement, such a period of time may be greater than but approaching the maximum designed exposure period, that is, the maximum open period obtainable when the shutter control circuit is able to respond to the brightness of an object being photographed. Such maximum open period is usually on the order of seconds to minutes. Thus, in the event the brightness of an object being photographed is reduced below a given level to prevent the completion of the shutter operation within a reasonable period of time, it is assured that the shutter assembly be closed after a period of time corresponding to the maximum designed exposure period or maximum shutter open period obtainable when the shutter control circuit is able to respond to the brightness of an object being photographed. In this manner, the above disadvantages of a conventional electrical shutter are eliminated. In addition, a more reliable operation of the electrical shutter control circuit including the photoelectric transducer element is provided.

In accordance with another aspect of the invention, the timing at which the photo-bias circuit operates to assure a closing operation of a shutter assembly can be controlled over a number of steps, thereby enabling an exposure over a prolonged period of time in such instances as during nighttime and thus increasing the operating range of the camera.

DETAILED DESCRIPTION OF PREFERRED EMBODIMENTS OF THE INVENTION

Figure 1:
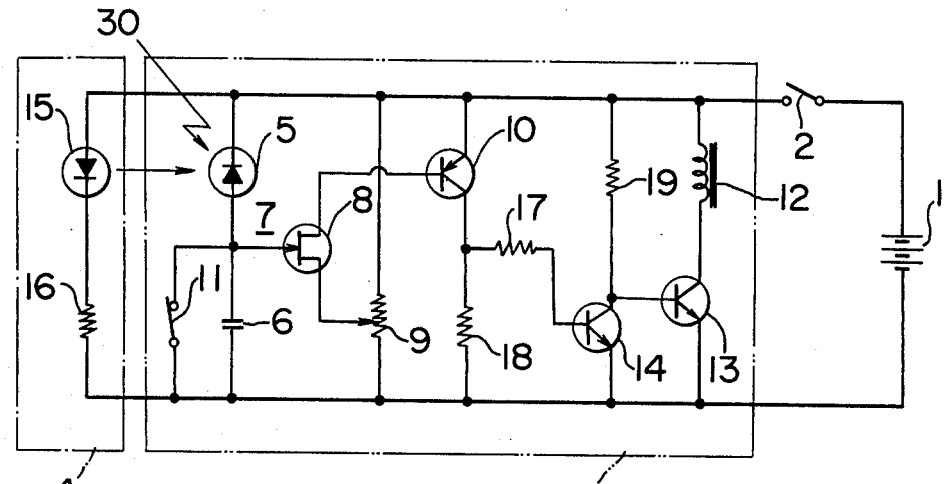
FIG. 1 is a circuit diagram of the electrical shutter circuit for a camera constructed in accordance with one embodiment of the invention.

Referring to FIG. 1, a d.c. power source 1 such as a battery is shown to be connected through a power switch 2 with an electrical shutter control circuit 3 and a photo-bias circuit 4. The shutter control circuit 3 comprises a photodiode 5 utilized as a photoelectric transducer element which is responsive to light 30 from an object being photographed to determine the brightness of such object. The photodiode 5 is connected in series with a capacitor 6 to form a time constant circuit 7, which is connected across the power source 1 through the power switch 2. The junction between the photodiode 5 and the capacitor 6 of the time constant circuit 7 is connected with a gate terminal of an N-type field effect transistor 8, the source terminal of which is connected with a slidable point on a potentiometer 9 and the drain terminal of which is connected with a base terminal of a PNP transistor 10. The potentiometer 9 is connected across the power source through the switch 2. The capacitor 6 is shunted by a shutter switch 11 which is adapted to be opened when a shutter assembly is operated for its opening movement. A solenoid 12 which is operative to block the closing operation of the shutter assembly, once an exposure light path is opened, is connected in series with an NPN transistor 13, and the series circuit thus formed is connected across the power source 1 through the power switch 2 as is another series circuit including an NPN transistor 14 and a resistor 19. The transistor 13 has its base terminal connected with the collector terminal of the transistor 14, the base terminal of which is connected through a coupling resistor 17 with the collector terminal of the transistor 10. The collector terminal of the transistor 10 is also connected with the emitter terminal of the transistor 14 through a resistor 18.

The photo-bias circuit 4 comprises a luminescent element shown as a luminescent diode 15, exhibiting a low power dissipation, connected in series with a resistor 16 which functions to adjust the amount of light emitted therefrom. This series circuit is connected across the power source 1 through the power switch 2. The luminescent diode 15 is disposed so that the light emitted therefrom impinges on the phototransistor 5 of the shutter control circuit 3, thus providing a photo bias of a relatively low intensity to the phototransistor 5.

The shutter assembly associated with the electrical shutter circuit of the invention is charged by a film winding operation of the camera so as to be ready for operation, and is released upon depression of a shutter button, whereupon a shutter blade or a first blind which opens an exposure path begins to run. When the exposure path is opened, photometry is initiated, and when a proper exposure has been achieved, the shutter control circuit operates to deenergize the solenoid 12 to allow a closing shutter blade or a second blind to run, thereby closing the exposure path.

The power switch 2 is operated in interlocked relationship with the operation of a shutter release button of the camera, and is adapted to be closed before the commencement of the operation of the shutter assembly when the release operation is effected.

In use, subsequent to a film winding operation of a camera, a shutter release operation will initially close the power switch 2, whereby the shutter control circuit 3 and the photo-bias circuit 4 are both connected with the power source 1 to initiate their operation, thus allowing a luminescence from the luminescent diode 15. Since the shutter switch 11 remains closed at this time, the field effect transistor 8 remains off as well as the transistors 10, 14. As a result, the transistor 13 is free to turn on to energize the solenoid 12, thereby blocking the closing operation of the shutter assembly. During the last stroke of the shutter release operation, an exposure path opening shutter blade or a first blind of the charged shutter assembly begins its operation, opening the exposure path. An exposure path closing shutter blade or a second blind tends to close in following relationship with the opening of the exposure path, but such closing operation is prevented by the action of the blocking solenoid 12, thereby maintaining the exposure path open.

The shutter switch 11 is opened in interlocked relationship with the opening operation of the shutter assembly, thereby allowing the capacitor 6 in the time constant circuit 7 to be charged. Then the gate potential of the field effect transistor 8 rises with a time constant determined by the resistance of the photodiode 5 and the capacitance of the capacitor 6, and when it reaches a given level, the transistor 8 turns on, which in turn allows the transistors 10 and 14 to turn on. Thus the transistor 13 is turned off to deenergize to solenoid 12, so that the constraint on the closing shutter blade of the shutter assembly is released, thus closing the exposure path. In this manner, the shutter assembly is open for a period of time which is determined by the time constant defined by the time constant circuit 7 of the shutter control circuit 3, and is closed thereafter.

Where the brightness of an object being photographed is reduced below a given level and the shutter control circuit 3 fails to establish a shutter open period in accordance with the brightness of an object being photographed as determined by the photodiode 5, as when the camera is encased to prevent the incidence of light onto the photodiode 5, the presence of a photo bias of a relatively low intensity onto the photodiode 5 from the luminescent diode 15 assures that the time constant circuit 7 will have a time constant which is determined by the photo bias, and hence the shutter assembly will have an open period which is also determined by the photo bias. It will be seen that the photo bias applied to the photodiode 5 operates to shift the operating point of the photodiode 5.

The resistance of the resistor 16 is adjusted to a value such that the level of the photo bias applied from the luminescent diode 15 is substantially comparable to the lowest brightness of an object being photographed to which the shutter control circuit 3 can respond, thus assuring a given shutter open period in the event the incidence of light from an object being photographed onto the photodiode 5 is interrupted. Since the amount of light emitted by the luminescent diode 15 can be adjusted precisely over an extensive range by merely adjusting the resistance of the resistor 16, the shutter open period determined by the shutter control circuit 3 in response to the photo bias can very simply and precisely be determined over an extensive range. An additional advantage resulting from the use of the photobias circuit is the fact that a more reliable and stable operation of the shutter control circuit 3 is assured in that the operative point of the photodiode 5 can be raised from a point where its operation is unstable to a more stable operating position when the normal level of incident light is low.

In the embodiment shown in FIG. 1, a single resistor 16 is connected in series with the luminescent diode 15, so that the shutter open period determined as a result of the photo bias can only assume a single value. If such shutter open period is preset to a value on the order of 1 minute, the shutter assembly will be automatically closed regardless of the light from an object being photographed even if a required exposure period exceeds a time interval of one minute after a shutter release operation. This would restrict the use of the camera in which the shutter circuit according to the invention is incorporated. Thus, a photographing operation requiring more than 1 minute, for example, taking pictures of a starlight night or fireworks, will be hindered because the shutter assembly will be closed as a result of the light from the luminescent diode 15. This is avoided by the arrangement shown in FIG. 2.

Figure 2:
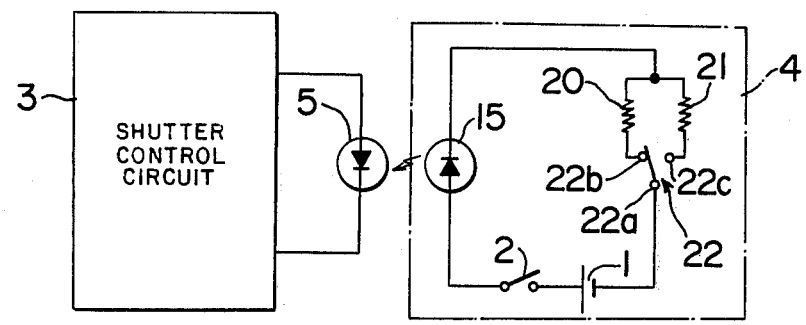
FIG. 2 is a circuit diagram of another embodiment of the photo-bias circuit which can be incorporated into the electrical shutter circuit of the invention.

The photo-bias circuit shown in FIG. 2 comprises a pair of resistors 20 and 21 which are alternately switched into the circuit with the luminescent diode 15 for changing the level of light emitted therefrom. A change-over switch 22 has its movable contact 22a connected with the negative terminal of the battery 1 and has its fixed contacts 22b and 22c connected with one end of the resistors 20 and 21, respectively. The other end of these resistors is connected with the cathode of the diode 15, the anode of which is connected through the power switch 2 with the positive terminal of the battery 1. The resistor 20 has a relatively low resistance such that a shutter open period of say ½ second may be obtained when it is connected in circuit. The other resistor 21 has a higher resistance such that a shutter open period of say ten minutes may be obtained when it is connected in circuit. When a photographing operation requires a prolonged period of time for exposure, the change-over switch 22 is switched to the fixed contact 22c to connect the resistor 21 in the photo-bias circuit so that an exposure period as long as 10 minutes may be allowed. After the lapse of the 10 minute period, the shutter control circuit becomes operative to close the shutter assembly. When the camera is used during daytime, the change-over switch 22 is switched to the fixed contact 22b to connect the resistor 20 in circuit, whereby the maximum shutter open period is limited to ½ second so as not to interfere with successive photographing operations.

Figure 3:
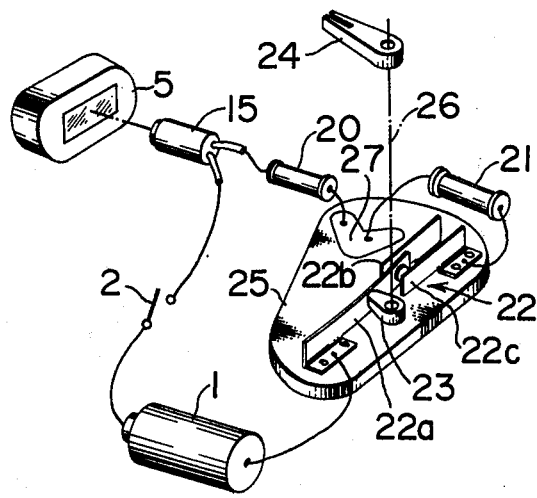
FIG. 3 is a circuit diagram, shown in the manner of a perspective view, of a further embodiment of the photo-bias circuit.

FIG. 3 shows a modification of the arrangement shown in FIG. 2 in that when the resistor 21 is connected in circuit, it is also connected in series with the resistor 20. One terminal of resistors 20 and 21 are connected to conductive pad 27. Pad 27 is electrically connected to contact 22b, for example, by a conductive lead provided on the underside of board 25 (not shown for purposes of simplicity). In this modification, the movable contact 22a of the change-over switch 22 is adapted to be operated by a cam member 23 which is in turn driven by a knob 24 that is provided on the exterior of the camera. The movable contact 22a and the fixed contacts 22b, 22c of the change-over switch 22 and the cam member 23 are mounted on a printed circuit board 25. By turning the knob 24 90° counter-clockwise (as viewed in FIG. 3) about its axis 26, the cam member 23 is operated to bring the movable contact 22a into engagement with the fixed contact 22c, whereby both resistors 20, 21 are connected in series with each other. By turning the knob 24 90° clockwise about the axis 26, the cam member 23 is operated to bring the movable contact 22a into engagement with the fixed contact 22b to connect only the resistor 20 in circuit.

While in the embodiments shown in FIGS. 2 and 3, a pair of resistors have been used to establish a relatively long and a relatively short shutter open period, it will be readily noted that the number of resistors may be increased as to permit a free choice among a number of established shutter open periods.

What is claimed is:

1. For use in preventing the premature exhaustion of a battery in a camera, an electrical circuit assembly for the camera comprising a shutter assembly and a control circuit therefor which is responsive to a shutter opening operation for automatically controlling the closing of the shutter assembly, the shutter control circuit including a photoelectric transducer element responsive to light reflected from an object being photographed for generating an output which aids in determining a proper exposure period in accordance with the brightness of the reflected light, integrating means connected in electrical series with said transducer element and responsive to the output of said element for developing a signal increasing toward an output level at a rate controlled by the magnitude of said transducer element output; means responsive to the presence of said output level for closing said shutter assembly; and a photo-bias circuit having a light emitting element for irradiating the photoelectric transducer element with light of a given intensity; a battery type portable power source, switch means for simultaneously energizing the light emitting element and the transducer element from the power source when the shutter opening operation is initiated, said photo-bias circuit element being connected in series with a resistor element for selective connection across said power source and being energized immediately upon initiation of the exposure and remaining energized at a constant value throughout the entire exposure period and regardless of the length of the exposure period or the intensity of light reflected from the subject and picked up by the transducer element, the value of the resistance element maintaining the intensity of illumination constant to controlling the shutter control circuit to close the shutter assembly at a given period of time after a shutter opening operation which given period is greater than a maximum designated period for a normal photographing operation, in the event that light reflected from an object being photographed which is incident on the photoelectric transducer element, while the shutter assembly is open, is very weak or absent, so as to enable the shutter assembly to remain open at least long enough to permit the occurrence of a normal photographing operation.

2. An electrical shutter circuit for a camera according to claim 1 in which there is provided a plurality of resistors and means for selectively connecting said resistors with the luminescent element, thereby permitting a variation in the level of light emitted by the luminescent element.

3. An electrical shutter circuit for a camera according to claim 1 in which the luminescent element comprises a luminescent diode of a low power dissipation.

4. The apparatus of claim 1, wherein the photobias circuit comprises a luminescent element and means for adjusting the light intensity of said element to control said maximum period wherein said by maximum period lies in the range between 0.5 seconds and several minutes.

* * * * *